United States Patent
Lim et al.

(10) Patent No.: US 10,042,383 B2
(45) Date of Patent: Aug. 7, 2018

(54) NAVIGATION SYSTEM AND MOUSE DEVICE

(71) Applicant: PixArt Imaging Inc., Hsin-Chu County (TW)

(72) Inventors: Kevin Len-Li Lim, Penang (MY); Zi-Hao Tan, Penang (MY)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

(21) Appl. No.: 15/896,106

(22) Filed: Feb. 14, 2018

(65) Prior Publication Data

US 2018/0173269 A1 Jun. 21, 2018

Related U.S. Application Data

(63) Continuation of application No. 14/834,841, filed on Aug. 25, 2015, now Pat. No. 9,927,831.

(51) Int. Cl.
- G06F 1/04 (2006.01)
- H03K 3/00 (2006.01)
- G06F 1/08 (2006.01)
- G01S 19/23 (2010.01)

(52) U.S. Cl.
CPC .............. *G06F 1/08* (2013.01); *G01S 19/235* (2013.01)

(58) Field of Classification Search
CPC .................................. G06F 1/08; G01S 19/235
USPC ......................................................... 327/291
See application file for complete search history.

(56) References Cited

U.S. PATENT DOCUMENTS

2013/0169369 A1 7/2013 Turner et al.

*Primary Examiner* — Lincoln Donovan
*Assistant Examiner* — Metasebia Retebo
(74) *Attorney, Agent, or Firm* — Hauptman Ham, LLP

(57) ABSTRACT

A clock calibration method of a navigation system is provided. The clock calibration method includes: entering a calibration mode; sequentially issuing, by a host, a count start signal and a count end signal separated by a time interval; counting a local oscillation frequency of a local oscillator when a navigation device receives the count start signal from the host; disabling the counting when the navigation device receives the count end signal from the host and generating a current count; generating a calibration signal according to the current count and a predetermined count corresponding to the time interval; and calibrating the local oscillation frequency of the local oscillator according to the calibration signal.

19 Claims, 3 Drawing Sheets

NAVIGATION SYSTEM AND MOUSE DEVICE

CROSS REFERENCE TO RELATED APPLICATION

This application is a continuation application of U.S. application Ser. No. 14/834,841, filed Aug. 25, 2015, the full disclosure of which is incorporated herein by reference.

BACKGROUND

1. Field of the Disclosure

This disclosure generally relates to a navigation system and, more particularly, to a navigation system and a clock calibration method thereof that utilize an external clock signal of a navigation device to calibrate an oscillation frequency of the navigation device.

2. Description of the Related Art

A mouse device generally employs an internal oscillator for providing the clock necessary in operation. For example, an oscillation frequency of the internal oscillator is configured to determine a frame rate of the mouse device, and the frame rate can influence the maximum detectable speed and acceleration.

However, in order to reduce the cost, the internal oscillator of a mouse device generally does not use an accurate oscillator, e.g., a crystal-based oscillator, such that an oscillation frequency of the internal oscillator can have a deviation up to ±20%. If the oscillation frequency is not calibrated, the frame rate, maximum detectable speed and acceleration also has a deviation up to ±20%.

Accordingly, a navigation device employing an adjustable oscillator and having an accurate oscillation frequency is necessary in the art.

SUMMARY

Accordingly, the present disclosure provides a navigation system and a clock calibration method thereof that use an external clock signal of a navigation device to calibrate an oscillation frequency of the navigation device.

The present disclosure provides a navigation system employing a serial peripheral interface.

The present disclosure further provides a navigation system including a host and a navigation device. The host includes a master interface and a master oscillator. The master interface is in the host and configured to send a mode signal, a count start signal and a count end signal. The master oscillator is configured to determine, by a master oscillation frequency, a time interval between the count start signal and the count end signal. The navigation device is configured to enter a calibration mode when receiving the mode signal and includes a slave interface, a local oscillator, a counter, a nonvolatile memory, a calibration calculation module and a trimming register. The slave interface is configured to receive the mode signal, the count start signal and the count end signal from the master interface. The local oscillator is configured to oscillate at a local oscillation frequency according to an oscillation parameter. The counter is configured to count the local oscillation frequency within the time interval between the count start signal, which is received from the host, and the count end signal, which is received from the host, and generate a current count. The nonvolatile memory is configured to previously store a predetermined count which corresponds to the time interval between the count start signal and the count end signal. The calibration calculation module is configured to generate a calibration signal according to the current count and the predetermined count. The trimming register is configured to calibrate the stored calibration parameter of the local oscillator according to the calibration signal.

The present disclosure further provides a mouse device configured to enter a calibration mode when receiving a mode signal from a data line of a serial interface bus. The mouse device includes a communication interface, a local oscillator, a counter, a calibration calculation module and a trimming register. The communication interface is configured to sequentially receive the mode signal, a count start signal, a count end signal and a predetermined count from the data line, wherein the predetermined count corresponds to a time interval between the count start signal and the count end signal. The local oscillator is configured to oscillate at a local oscillation frequency according to an oscillation parameter. The counter is configured to be enabled by the count start signal, which is received from the data line, to start to count the local oscillation frequency and disabled by the count end signal, which is received from the data line, to stop counting the local oscillation frequency, and generate a current count. The calibration calculation module is configured to generate a calibration signal according to the current count and the predetermined count. The trimming register is configured to calibrate the stored calibration parameter of the local oscillator according to the calibration signal.

The present disclosure further provides a mouse device configured to enter a calibration mode when receiving a mode signal from a data line of a serial interface bus. The mouse device includes a communication interface, a local oscillator, a counter, a nonvolatile memory, a calibration calculation module and a trimming register. The communication interface is configured to sequentially receive the mode signal, a count start signal and a count end signal from the data line. The local oscillator is configured to oscillate at a local oscillation frequency according to an oscillation parameter. The counter is configured to be enabled by the count start signal, which is received from the data line, to start to count the local oscillation frequency and disabled by the count end signal, which is received from the data line, to stop counting the local oscillation frequency, and generate a current count. The nonvolatile memory is configured to previously store a predetermined count which corresponds to a time interval between the count start signal and the count end signal. The calibration calculation module is configured to generate a calibration signal according to the current count and the predetermined count. The trimming register is configured to calibrate the stored calibration parameter of the local oscillator according to the calibration signal.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
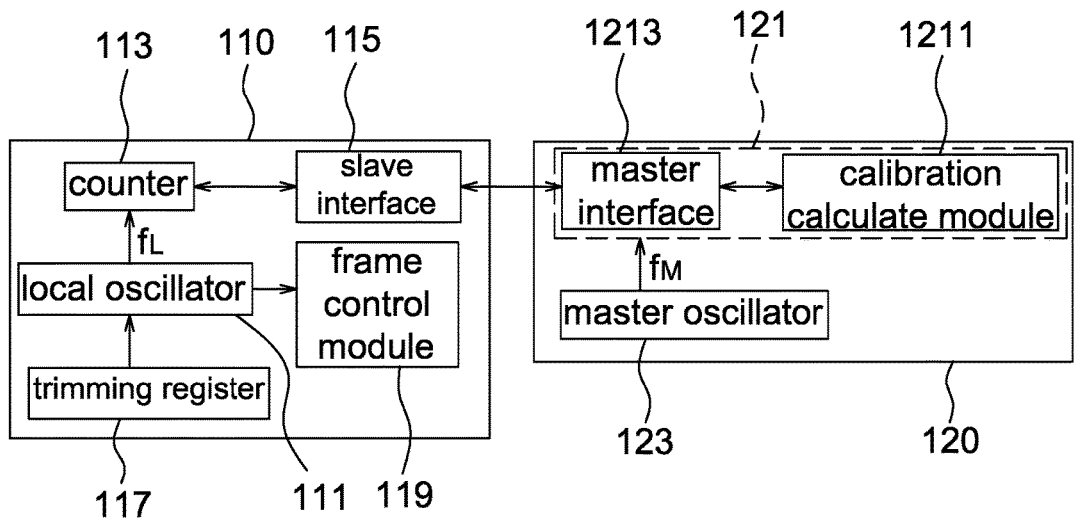
FIG. 1 is a schematic block diagram of a navigation system according to a first embodiment of the present disclosure.

Referring to FIG. 1, it is a schematic block diagram of a navigation system 100 according to a first embodiment of the present disclosure. The navigation system 100 includes a navigation device 110 and a host 120. In one embodiment, the navigation device 110 is, for example, a mouse device, but not limited thereto. In other embodiments, the navigation device 110 is other electronic devices as long as a crystal-based local oscillator is not used therein and a local oscillation frequency thereof has to be calibrated.

The host 120 is a computer system which includes a processor 121 and a master oscillator 123. The processor 120 is, for example, a microcontroller (MCU) or a central processing unit (CPU). The master oscillator 123 is an external oscillator of the processor 123. In the present disclosure, the master oscillator 123 of the host 120 is configured as a reference to calibrate a local oscillation frequency $f_L$ of the navigation device 110, and thus the master oscillator 123 preferably has an accurate oscillation frequency. For example, a frequency tolerance of the master oscillator 123 is preferably within 1%. The master oscillator 123 is, for example, a crystal-based oscillator.

Figure 2:
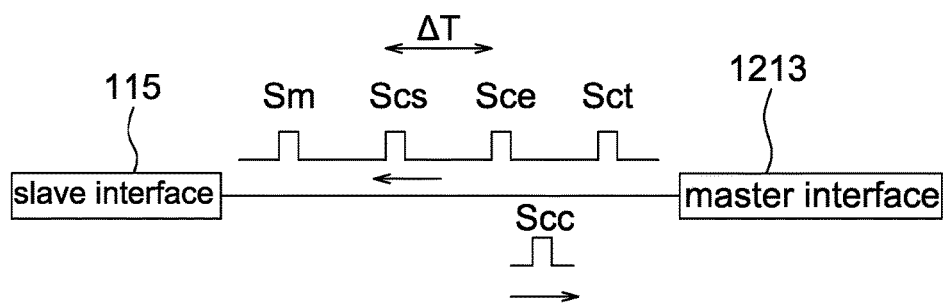
FIG. 2 is an operational schematic diagram of a navigation system according to a first embodiment of the present disclosure.

Referring to FIGS. 1 and 2, FIG. 2 is an operational schematic diagram of a navigation system 100 according to a first embodiment of the present disclosure. In the first embodiment, the processor 121 of the host 120 includes a calibration calculation module 1211 and a mater interface 1213, wherein the calibration calculation module 1211 is implemented by software and/or hardware, and the master interface 1213 is a communication interface. The calibration calculation module 1211 is configured to generate a calibration signal Sct, which is sent to the navigation device 110 from the master interface 1213, to calibrate a local oscillation frequency $f_L$ of the navigation device 110. The processor 121 sends, via the master interface 1213, a mode signal Sm, a count start signal Scs, a count end signal Sce and the calibration signal Sct, wherein the count start signal Scs is separated from the count end signal Sce by a time interval ΔT. The master oscillator 123 has a master oscillation frequency $f_M$. As mentioned above, as the master oscillator 123 is an accurate oscillator, the time interval ΔT is determined by the master oscillation frequency $f_M$ of the master oscillator 123. For example, if the master oscillation frequency $f_M$ is 24 MHZ and when it oscillates 240,000 times, the time interval ΔT is 10 ms which is taken as an accurate value.

The navigation device 110 includes a local oscillator 111, a counter 113, a slave interface 115 and a trimming register 117, wherein the slave interface 115 is a communication interface. When the navigation device 110 is a mouse device, a frame control module 119 is further included to control a frame rate of the mouse device. It is appreciated that as the frame rate is determined by a local oscillation frequency $f_L$ of the local oscillator 111, and if the local oscillation frequency $f_L$ is accurate, the frame rate is accurate accordingly.

In one embodiment, the navigation device 110 enters a calibration mode when receiving the mode signal Sm, wherein for reducing the consumption power, in the calibration mode operation of at least a part of components of the navigation device 110 other than the local oscillator 111, the counter 113, the slave interface 115 and the trimming register 117 is reduced or deactivated.

The local oscillator 111 oscillates at a local oscillation frequency $f_L$ according to an oscillation parameter, wherein the oscillation parameter is determined according to the type of the local oscillator 111. The local oscillator 111 is preferably an adjustable oscillator, e.g. an RC oscillator or a voltage control oscillator (VCO) such that the oscillation parameter includes, for example, a resistor value, a capacitor value, a voltage value or the like, but not limited thereto. The oscillation parameter is stored in the trimming register 117, and when the trimming register 117 is reset or updated, the oscillation parameter is changed.

The counter 113 is enabled by the count start signal Scs to start to count the local oscillation frequency $f_L$ and disabled by the count end signal Sce to stop counting the local oscillation frequency $f_L$ and generates a current count Scc counted between the count start signal Scs and the count end signal Sce. As mentioned above, if it is assumed that the local oscillation frequency $f_L$ of the local oscillator 111 is 24 MHZ, an accurate count of the current count Scc corresponding to the time interval ΔT is 240,000 times, which is served as the predetermined count. If the current count Scc is not equal to the predetermined count or a count difference therebetween exceeds a predetermined threshold, the frequency calibration is performed.

The slave interface 115 is configured to receive the mode signal Sm, the count start signal Scs, the count end signal Sce and the calibration signal Sct from the master interface 1213, and send the current count Scc (more specifically, the signal containing information of the current count Scc) to the master interface 1213 for the processor 121 to calculate the calibration signal Sct. The calibration signal Sct contains, for example, a frequency difference or ratio between the current count Scc and the predetermined count. For example, when the current count Scc is larger than the predetermined count, the calibration signal Sct is used to decrease the local oscillation frequency $f_L$ according to the frequency difference or ratio; on the contrary, when the current count Scc is smaller than the predetermined count, the calibration signal Sct is used to increase the local oscillation frequency $f_L$ according to the frequency difference or ratio.

The trimming register 117 is configured to calibrate the stored oscillation parameter of the local oscillator 111 according to the calibration signal Sct. For example, in the first embodiment, the host 120 updates or resets the oscillation parameter through the calibration signal Sct so as to calibrate the local oscillation frequency E.

The operation of the first embodiment is illustrated below:

Firstly, the host 120 sends, via the master interface 1213 thereof, a mode signal Sm to the navigation device 110 to allow the navigation device 110 to enter a calibration mode, wherein the calibration mode is entered when the navigation device 100 is in startup each time, when a sleep mode is ended, every predetermined time interval or by a choice of a user.

Next, the host 120 sequentially issues, via the master interface 1213 thereof, a pair of counter control signals separated by a time interval ΔT, such as the count start signal Scs and the count end signal Sce, to the navigation device 110. The navigation device 110 counts an oscillating number of the local oscillator 111 within the time interval ΔT to be served as a current count Scc, which is then sent back to the host 120 via the slave interface 115 thereof.

Then, the calibration calculation module 1211 of the host 120 generates a calibration signal Sct, which is then sent to the navigation device 110 via the master interface 1213 to reset the oscillation parameter in the trimming register 117, according to the current count Scc and a predetermined count corresponding to the time interval ΔT thereby calibrating the local oscillation frequency $f_L$ of the local oscillator 111. As mentioned above, the time interval ΔT is determined by the master oscillation frequency $f_M$, which is taken as a correct frequency, and thus the time interval ΔT is also taken as a correct value to be served as a reference for calibrating the local oscillation frequency $f_L$.

Figure 3:
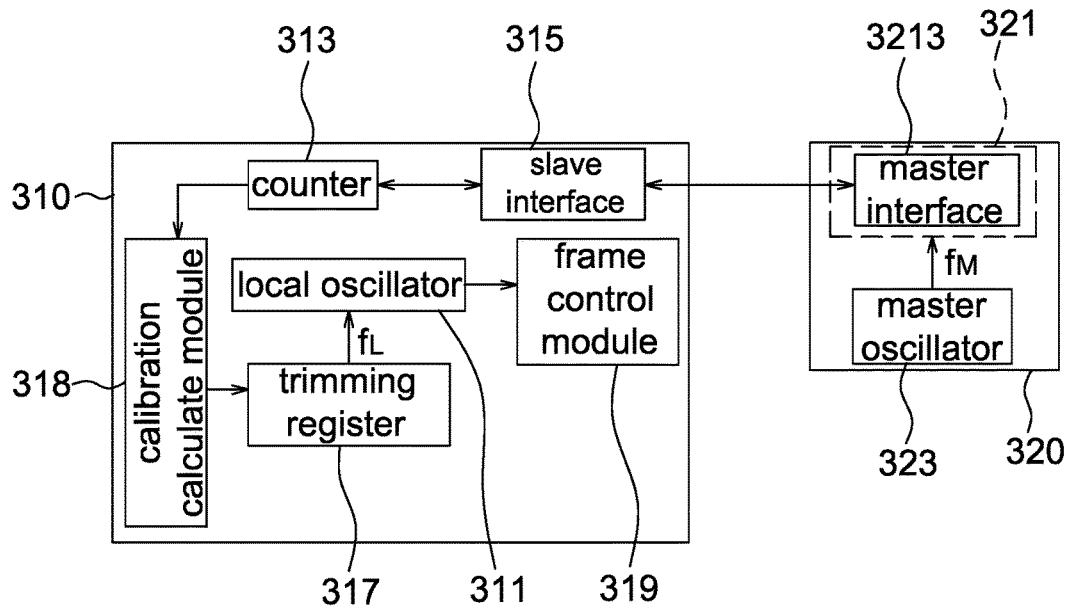
FIG. 3 is a schematic block diagram of a navigation system according to a second embodiment of the present disclosure.

Referring to FIG. 3, it is a schematic block diagram of a navigation system 300 according to a second embodiment of the present disclosure. The navigation system 300 also includes a navigation device 310 and a host 320. Components included in the navigation system 300 of the second embodiment are substantially identical to those of the first embodiment. The difference is that in the second embodiment, a calibration calculation module 318 is included in the navigation device 310 rather than in the host 320. More specifically, in the second embodiment the navigation device 310 calculates the calibration signal. Similarly, the calibration calculation module 318 is implemented by software and/or hardware.

Figure 4:
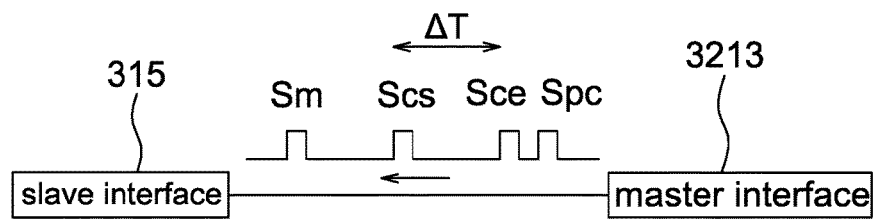
FIG. 4 is an operational schematic diagram of a navigation system according to a second embodiment of the present disclosure.

Referring to FIGS. 3 and 4, FIG. 4 is an operational schematic diagram of a navigation system 300 according to a second embodiment of the present disclosure. The host 320 includes a processor 321 and a master oscillator 323. The processor 321 includes a master interface 3213. The master interface 3213 is also a communication interface and configured to send a mode signal Sm, a count start signal Scs and a count end signal Sce. In addition, the master interface 3213 is further configured to directly send a predetermined count Spc, which corresponds to a time interval ΔT between the count start signal Scs and the count end signal Sce. As mentioned above, the master oscillator 323 is an accurate oscillator (e.g. frequency tolerance within 1%) and oscillates at a master oscillation frequency $f_M$ to determine the time interval ΔT. The master oscillator 323 is also an external oscillator of the processor 321.

The navigation device 310 includes a local oscillator 311, a counter 313, a slave interface 315, a trimming register 317 and a calibration calculation module 318. The navigation device 310 also enters a calibration mode when receiving the mode signal Sm. For example, in the calibration mode, operation of at least a part of components of the navigation device 310 other than the local oscillator 311, the counter 313, the slave interface 315, the calibration calculation module 318 and the trimming register 317 is reduced or deactivated.

The slave interface 315 is also a communication interface and configured to receive the mode signal Sm, the count start signal Scs, the count end signal Sce and the predetermined count Spc from the master interface 3213. In this embodiment, the host 320 already knows a correct local oscillation frequency $f_L$ of the navigation device 310, and thus when the time interval ΔT is determined, the corresponding predetermined count Spc is known and sent to the navigation device 310.

The local oscillator 311 oscillates at a local oscillation frequency $f_L$ according to an oscillation parameter. As mentioned above, the oscillation parameter is determined according to the type of the adjustable oscillator without particular limitations, and the oscillation parameter is stored in the trimming register 317.

The counter 313 is enabled by the count start signal Scs to start to count the local oscillation frequency $f_L$ and disabled by the count end signal Sce to stop counting the local oscillation frequency $f_L$ and generates a current count counted between the count start signal Scs and the count end signal Sce.

The calibration calculation module 318 is configured to generate a calibration signal according to the current count and the predetermined count Spc sent from the host 320. In this embodiment, the current count needs not to be sent to the host 320.

The trimming register 317 is configured to calibrate the stored oscillation parameter of the local oscillator 311 according to the calibration signal. In the second embodiment, the navigation device 310 updates or resets the oscillation parameter through the calibration signal generated thereby so as to calibrate the local oscillation frequency $f_L$.

The operation of the second embodiment is illustrated below:

Firstly, the host 320 sends, via the master interface 3213 thereof, a mode signal Sm to the navigation device 310 to allow the navigation device 310 to enter a calibration mode. Similarly, the calibration mode is entered when the navigation device 300 is in startup each time, when a sleep mode is ended, every predetermined time interval or by a choice of a user.

Next, the host 320 sequentially issues, via the master interface 3213 thereof, a pair of counter control signals separated by a time interval ΔT, such as the count start signal Scs and the count end signal Sce, and a predetermined count Spc to the navigation device 310. The navigation device 310 counts an oscillating number of the local oscillator 311 within the time interval ΔT to be served as a current count.

Then, the calibration calculation module 318 of the navigation device 310 generates a calibration signal according to the current count corresponding to the time interval ΔT and the received predetermined count Spc so as to update or reset the oscillation parameter in the trimming register 317 thereby calibrating the local oscillation frequency $f_L$ of the local oscillator 311.

In another embodiment, the predetermined count Spc is not sent by the host 320 to the navigation device 310 via a communication interface (e.g. including the master interface 3213 and the slave interface 315) but previously stored in the navigation device 310 (e.g. the navigation device 310 further including a nonvolatile memory or other memory unit). In this case, the host 320 issues a pair of counter control signals corresponding to the predetermined count Spc to enable and disable the counter 313 to count the local oscillator 311. It is appreciated that in this embodiment the host 320 previously knows the time interval ΔT corresponding to the predetermined count Spc, and the time interval ΔT is obtainable by counting the master oscillation frequency $f_M$.

Figure 5:
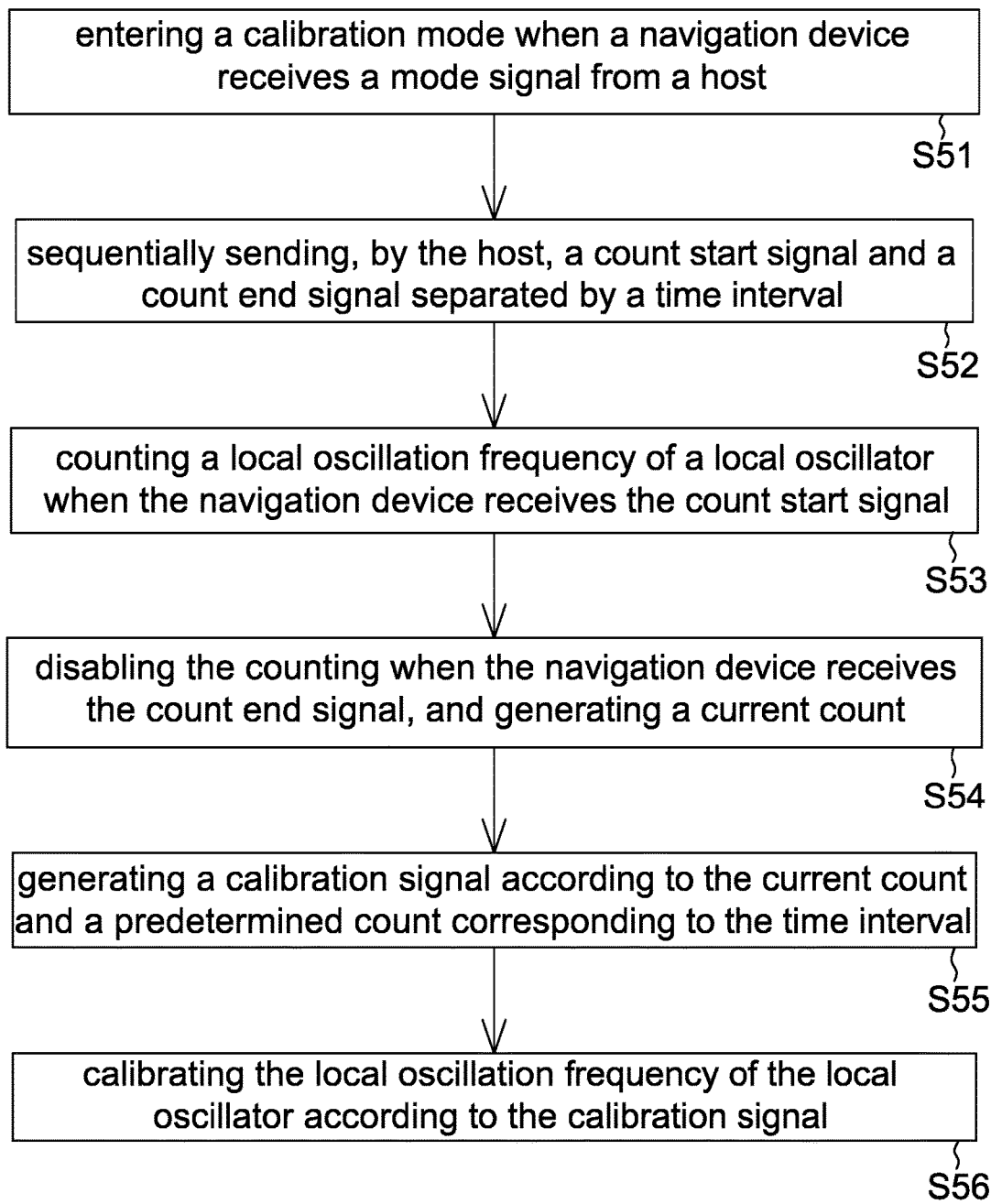
FIG. 5 is a flow chart of a clock calibration method of a navigation system according to an embodiment of the present disclosure.

Referring to FIG. 5, it is a flow chart of a clock calibration method of a navigation device according to an embodiment of the present disclosure, which is applicable to the navigation system of FIGS. 1 and 3. The clock calibration method includes the steps of: entering a calibration mode when a navigation device receives a mode signal from a host (Step S51); sequentially sending, by the host, a count start signal and a count end signal separated by a time interval (Step S52); counting a local oscillation frequency of a local oscillator when the navigation device receives the count start signal from the host (Step S53); disabling the counting when the navigation device receives the count end signal from the host and generating a current count (Step S54); generating a calibration signal according to the current count and a predetermined count corresponding to the time interval (Step S55); and calibrating the local oscillation frequency of the local oscillator according to the calibration signal (Step S56).

Step S51: As mentioned above, in a predetermined condition the host 120/320 sends a mode signal Sm to the navigation device 110/310 to allow the navigation device 110/310 to enter a calibration mode. In the calibration mode, operation of some components of the navigation device 110/310 is slow down or stopped.

Step S52: The host 120/320 sequentially issues a pair of counter control signals, e.g. a count start signal Scs and a count end signal Sce, separated by a time interval $\Delta T$ to the navigation device 110/310. As mentioned above, the time interval $\Delta T$ is determined by counting a master oscillation frequency $f_M$ of the master oscillator 123/323, and the time interval $\Delta T$ is taken as an accurate time interval.

Steps S53-S54: The counter 113/313 starts to count the local oscillation frequency $f_L$ of the local oscillator 111/311 when the navigation device 110/310 receives the count start signal Scs and stops counting the local oscillation frequency $f_L$ of the local oscillator 111/311 when the navigation device 110/310 receives the count end signal Sce. Accordingly, the counter 113/313 counts an oscillating number of the local oscillator 111/113 within the time interval $\Delta T$ to be served as a current count.

Step S55: There two methods to generate a calibration signal according to the current count and a predetermined count corresponding to the time interval $\Delta T$. In one embodiment, the calibration signal Sct is generated by the host 120 according to the current count and a predetermined count corresponding to the time interval $\Delta T$. In this case, the clock calibration method further includes the steps of: sending the current count Scc from the navigation device 110 to the host 120; and sending the calibration signal Sct from the host 120 to the navigation device 110 (for example referring to FIG. 2). In a second embodiment, the calibration signal Sct is generated by the navigation device 310 according to the current count and a predetermined count corresponding to the time interval $\Delta T$. In this case, the clock calibration method further includes the steps of: sending the predetermined count Spc (more specifically, the signal containing information of the predetermined count Spc) from the host 320 to the navigation device 310 (for example referring to FIG. 4).

Step S56: Finally, the trimming register 117/31 resets or updates the stored oscillation parameter of the local oscillator 111/311 according to the calibration signal so as to adjust the local oscillation frequency $f_L$ of the local oscillator 111/311.

As mentioned above, the steps S51-S56 are performed when the navigation device is in startup each time, when a sleep mode is ended, every predetermined time interval or by a choice of a user.

It should be mentioned that in FIG. 4, the predetermined count Spc may be sent to the navigation device 110 before the pair of counter control signals and is not limited to that shown in FIG. 4.

In every embodiment of the present disclosure, the mode signal Sm, the count start signal Scs and the count end signal Sce are predetermined protocol signals identifiable by the master interface 1213/3213 and the slave interface 115/315 without particular limitations.

In the present disclosure, the master interface 1213/3213 and the slave interface 115/315 form a one-wire, two-wire, three-wire or four-wire serial interface to perform the data communication, e.g. a serial peripheral interface or an I2C serial interface, but not limited thereto. The mode signal Sm, the count start signal Scs, the count end signal Sce, the calibration signal Sct, the current count Scc and the predetermined count Spc are sent via the data line of the serial interface bus. In addition, arrows shown in FIGS. 2 and 4 indicate the data transmission direction.

It should be mentioned that values of the frequency, count number and time interval mentioned above are only intended to illustrate but not to limit the present disclosure. In addition, the master oscillation frequency $f_M$ and the local oscillation frequency $f_L$ are not necessary to be identical.

It is appreciated that when the local oscillation frequency $f_L$ is calibrated according to the calibration signal, the calibration mode is left. In addition, the local oscillation frequency $f_L$ is adjusted once to a target frequency or gradually adjusted to the target frequency by several steps according to different applications.

As mentioned above, although a local oscillator of a mouse device has a lower cost, it is not accurate. Therefore, the present disclosure further provides a navigation system (FIGS. 1 and 3) and a clock calibration method thereof (FIG. 5) that calibrate a local oscillation frequency of a local oscillator of a slave device based on a master oscillation frequency of a master oscillator of a host so as to solve the incorrect problem of the local oscillator.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A navigation system, comprising:
  a host, the host comprising:
    a master interface, which is in the host, configured to send a mode signal, a count start signal and a count end signal; and
    a master oscillator configured to determine, by a master oscillation frequency, a time interval between the count start signal and the count end signal; and
  a navigation device configured to enter a calibration mode when receiving the mode signal, the navigation device comprising:
    a slave interface configured to receive the mode signal, the count start signal and the count end signal from the master interface;
    a local oscillator configured to oscillate at a local oscillation frequency according to an oscillation parameter;
    a counter configured to count the local oscillation frequency within the time interval between the count start signal, which is received from the host, and the count end signal, which is received from the host, and generate a current count;

a nonvolatile memory configured to previously store a predetermined count which corresponds to the time interval between the count start signal and the count end signal;

a calibration calculation module configured to generate a calibration signal according to the current count and the predetermined count; and a trimming register configured to calibrate the stored calibration parameter of the local oscillator according to the calibration signal.

2. The navigation system as claimed in claim 1, wherein the master interface and the slave interface form a serial peripheral interface.

3. The navigation system as claimed in claim 1, wherein a frequency tolerance of the master oscillator is within 1%.

4. The navigation system as claimed in claim 1, wherein the local oscillator is an adjustable oscillator.

5. The navigation system as claimed in claim 1, wherein the mode signal, the count start signal and the count end signal are predetermined protocol signals identifiable by the master interface and the slave interface.

6. The navigation system as claimed in claim 1, wherein the master interface of the host is included in a processor, and the master oscillator is an external oscillator of the processor.

7. The navigation system as claimed in claim 1, wherein in the calibration mode operation of at least a part of components of the navigation device other than the local oscillator, the counter, the slave interface, the calibration calculation module and the trimming register is reduced or deactivated.

8. A mouse device, the mouse device configured to enter a calibration mode when receiving a mode signal from a data line of a serial interface bus, the mouse device comprising:

a communication interface configured to sequentially receive the mode signal, a count start signal, a count end signal and a predetermined count from the data line, wherein the predetermined count corresponds to a time interval between the count start signal and the count end signal;

a local oscillator configured to oscillate at a local oscillation frequency according to an oscillation parameter;

a counter configured to be enabled by the count start signal, which is received from the data line, to start to count the local oscillation frequency and disabled by the count end signal, which is received from the data line, to stop counting the local oscillation frequency, and generate a current count;

a calibration calculation module configured to generate a calibration signal according to the current count and the predetermined count; and a trimming register configured to calibrate the stored calibration parameter of the local oscillator according to the calibration signal.

9. The mouse device as claimed in claim 8, wherein the local oscillator is an adjustable oscillator.

10. The mouse device as claimed in claim 8, wherein in the calibration mode operation of at least a part of components of the mouse device other than the local oscillator, the counter, the slave interface, the calibration calculation module and the trimming register is reduced or deactivated.

11. The mouse device as claimed in claim 8, wherein the serial interface bus is coupled to a communication interface of a host.

12. The mouse device as claimed in claim 11, wherein the time interval is determined by a master oscillation frequency of the host.

13. The mouse device as claimed in claim 8, wherein the predetermined count is associated with a correct local oscillation frequency of the local oscillator.

14. A mouse device, the mouse device configured to enter a calibration mode when receiving a mode signal from a data line of a serial interface bus, the mouse device comprising:

a communication interface configured to sequentially receive the mode signal, a count start signal and a count end signal from the data line;

a local oscillator configured to oscillate at a local oscillation frequency according to an oscillation parameter;

a counter configured to be enabled by the count start signal, which is received from the data line, to start to count the local oscillation frequency and disabled by the count end signal, which is received from the data line, to stop counting the local oscillation frequency, and generate a current count;

a nonvolatile memory configured to previously store a predetermined count which corresponds to a time interval between the count start signal and the count end signal;

a calibration calculation module configured to generate a calibration signal according to the current count and the predetermined count; and a trimming register configured to calibrate the stored calibration parameter of the local oscillator according to the calibration signal.

15. The mouse device as claimed in claim 14, wherein the local oscillator is an adjustable oscillator.

16. The mouse device as claimed in claim 14, wherein in the calibration mode operation of at least a part of components of the mouse device other than the local oscillator, the counter, the slave interface, the calibration calculation module and the trimming register is reduced or deactivated.

17. The mouse device as claimed in claim 14, wherein the serial interface bus is coupled to a communication interface of a host.

18. The mouse device as claimed in claim 17, wherein the time interval is determined by a master oscillation frequency of the host.

19. The mouse device as claimed in claim 14, wherein the predetermined count is associated with a correct local oscillation frequency of the local oscillator.

* * * * *